June 12, 1962 J. C. MAXSON 3,038,377
CLASPS
Filed Jan. 22, 1959 2 Sheets-Sheet 1
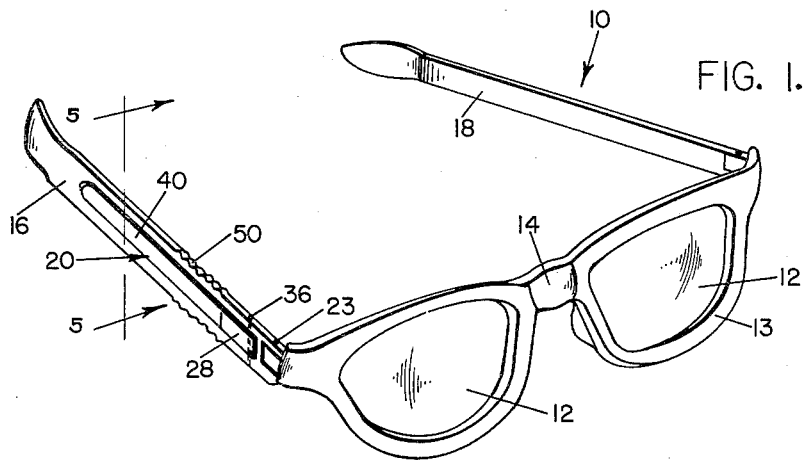
FIG. 1.
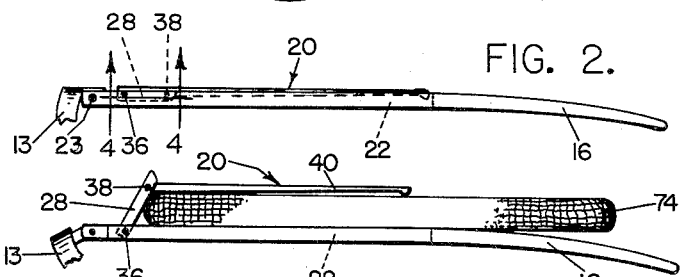
FIG. 2.
FIG. 3.
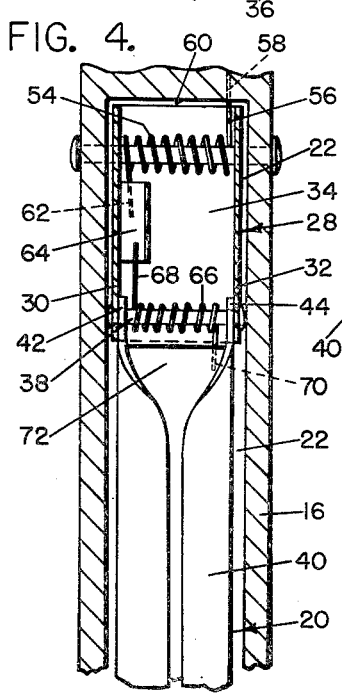
FIG. 4.
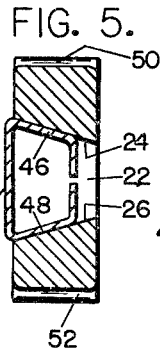
FIG. 5.
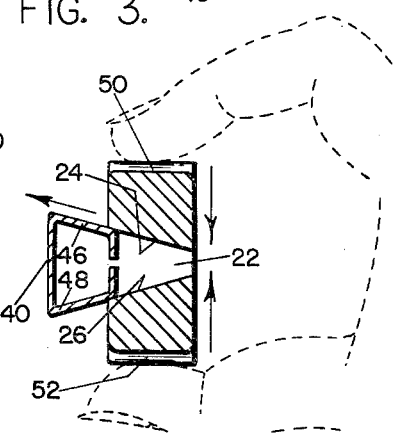
FIG. 6.
INVENTOR,
JOHN C. MAXSON.
BY
ATTORNEY June 12, 1962   J. C. MAXSON   3,038,377
CLASPS Filed Jan. 22, 1959   2 Sheets-Sheet 2

INVENTOR;
JOHN C. MAXSON.

BY *Robert M. Dunning*

ATTORNEY

United States Patent Office 3,038,377
Patented June 12, 1962

3,038,377
CLASPS
John C. Maxson, 1885 Bayard Ave., St. Paul, Minn.
Filed Jan. 22, 1959, Ser. No. 788,397
7 Claims. (Cl. 88—52)

This invention relates to clasps and more especially to a clasp for use on the temple bars or bows of spectacle frames.

Clips, similar to those used on pencils or pens, have been designed for use on spectacle bows for the purpose of attaching the glasses to a shirt or coat pocket. Such clips project from the outer surfaces of the bows and detract from the appearance of the glasses frames. Furthermore, in order to hold the glasses to a pocket of thin fabric, the spread of such clips is normally limited. Vehicle drivers often desire to clip glasses such as sun glasses, to the sun visor of the vehicle. This is impossible with usual clip construction without bending the clips beyond the elastic limit of the material and making the clips useless for holding the glasses to thinner panels such as the fabric forming garment pockets.

Furthermore, clasps of this general character often require that the end of the clasp be manually flexed outwardly from the bow to which they are attached prior to fastening them in pockets. This manual flexing is often difficult and awkward and over a long period of time will result in the clip losing its temper or tension which will eventually render it ineffective.

With these thoughts in mind this invention contemplates, in combination with a spectacles bow, a clip adjacent to or extending into a slot which may be disposed through the bow and means for moving the clip outwardly from the bow.

Another feature of this invention lies in a novel means connecting the clip to the bow including a link which is pivotally connected to the bow and a swingable end portion which is pivotally connected to the link. Resilient means at the pivot points normally retain the link portion and the end portion of the clip at least partially in the slot, with the converging sides of the clip end portion and the slot in engagement.

The link and end portion arrangement of the clip make it possible to attach the spectacles frame to an item such as an automobile visor which is much thicker, for instance, than the fabric of a pocket in wearing apparel. The link is capable of defining an arc of 90° whereby the link may be disposed at a 90° angle to the bow to which it is attached.

The end portion pivotally attached to the free end of the link will be urged toward the bows by resilient means disposed at its point of connection to the link. When an article such as a pocket, auto visor or the like is disposed between the end portion of the clip and the bows, the end portion will be urged toward the article in substantially parallel relation thereto engaging the article along substantially all of the inner surface of the clip end portion.

An added feature of this invention includes a modification of the bow construction. This embodiment includes a clip which is formed integrally with the bow. The means employed for moving the clip outwardly from the bow comprises tapered plugs in the bow designed to engage the inner side of the clip and to move the clip outwardly when the tapered plugs are moved towards each other.

A further feature of this invention includes a modification for moving a clip out of engagement with a bow. This modification includes opposed plugs positioned within a cavity and in communication with a leaf spring. As the plugs are urged towards each other the leaf spring is compressed, the apex of which is abutted against the clip and is moved outwardly of the cavity and hence will force the clip outwardly from the bow. As the clip may extend into the slot of the bow or adjacent the bow, it must be moved outwardly therefrom prior to attaching the spectacles frame to a pocket or other article. Pressure applied by the fingers to the bow on opposite sides of the slot will cause the converging sides of the end portion of the clip to move outwardly from the bows. Pressure applied to the plug means employed will similarly move the clip out of engagement with the bow.

Other features and advantages will appear from the following description taken in connection with the drawing wherein:

FIGURE 1 is a perspective view of a spectacle frame showing the clip attached to one of the bows thereof.

FIGURE 2 is a plan view of a bow and a portion of spectacle frames showing the position of the clip in engagement with the bow.

FIGURE 3 is a plan view of a bow showing in section a portion of material disposed between the clip and a bow.

FIGURE 4 is an enlarged longitudinal sectional view through a portion of the clip, taken substantially on line 4—4 of FIGURE 2.

FIGURE 5 is an enlarged transverse sectional view of the bow and clip taken on line 5—5 of FIGURE 1.

FIGURE 6 is a view similar to FIGURE 5 but showing diagrammatically the manner in which the clip is moved outwardly from the bow.

Figure 7:
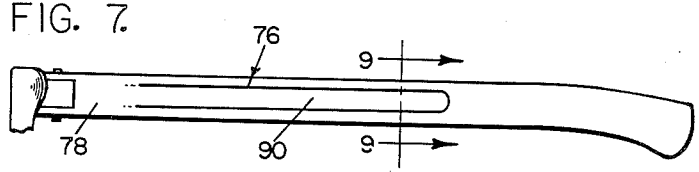
FIGURE 7 is a side elevational view of a modified form of bow and clip construction.

While one embodiment of the invention is illustrated in the above-referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

A glasses frame is indicated in general by the numeral 10, these being of the conventional type for the purpose of clarity and illustration. The frame 10 is provided with lenses 12 enclosed in rims 13 connected by a nose rest 14, and a pair of bows 16 and 18 which are hingedly connected to the frame rims 13 in any suitable manner.

A clip which is generally indicated by the numeral 20 is attached to one of the bows and hereinafter will be described as being attached to the bow 16 although it may be attached to either with equal effectiveness.

The bow or temple bar 16 is preferably formed of a resilient material and comprises an elongated body having a slot 22 disposed therethrough. The slot 22 preferably extends from a point near the bow hinge connection 23 to a point intermediate the bow ends. As is more clearly shown in FIGURES 5 and 6, the slot 22 is provided with sides 24 and 26 which converge inwardly towards the inner surfaces of the bow for purposes later to be described.

The clip 20 comprises a link 28 which is preferably channel-shaped in transverse section having parallel sides 30 and 32 connected by a web portion 34. The sides 30 and 32 are provided with aligned apertures adapted to accommodate pivot pins 36 and 38. The pin 36 also extends through the portions of the bow on opposite sides of the slot 22 to hingedly connect the link 28 to the bow within the slot 22 as is best seen in FIGURE 4.

The clip 20 further includes an elongated end portion 40 which is generally trapezoidal in cross section and is provided at one end with a pair of ears 42 and 44 having aligned apertures therethrough to accommodate the pivot pin 38. The ears 42 and 44 extend into the link between its side walls 30 and 32 whereby the connecting pin 38 serves as a hinge between the link 28 and the end portion 40.

The converging sides 46 and 48 of the generally trapezoidally shaped end portion 40 are adapted to engage the converging sides 24 and 26 of the slot 22 so that when pressure is applied to the bow on edges 50 and 52 opposite the converging sides of the slot the sides 24 and 26 will be urged toward each other. This wedging action will cause the end portion 40 of the clip to be moved outwardly from the slot as is indicated in FIGURE 6 of the drawings.

To impart yieldability or tension to the clip, resilient spring means are employed at the points of pivot as is shown in FIGURE 4. A torsion spring 54 is disposed about the pivot pin 36 having one end 56 disposed into a minute bore 58 which extends into the bow from the end wall 60 of the slot 22. Torsion is created by projecting the opposite end 62 of the spring beneath a tab 64 which depends from the wall 30 of the link 28. Thus, this arrangement will normally retain the link portion extended into the slot.

Similarly the end portion 40 is normally retained in the slot by a further torsion spring 66 encircling the pivot 38 having one end 68 bearing against the tab 64 while the other end 70 is engaged against a web 72 of the end portion 40. As is illustrated in FIGURE 3 of the drawings it will be seen that the material 74 may be substantially thicker than an ordinary apparel pocket and that a spectacle frame embodying the link type clip connection shown in FIGURES 1 through 6 may be readily clipped to such an article, i.e. an automobile visor. The spring 54 is preferably slightly more resilient than the spring 60 so that when the sides 24 and 26 of the slot 22 are urged together the clip end 40 is the first element to be urged from the slot. The link 28 may then be forced outwardly against the action of the spring 54 depending upon the thickness of the article to which the spectacles frame is being clipped. In this manner the tensions of the springs 54 and 66 combine to hold the clip secure and parallel to the article to which it is clipped.

It is understood that the sides of the slot 22 opposite the link 28 need not be converging since it is not necessary to force the link from the slot the same instant as the end portion 40 is forced therefrom by pressure on the bows. However, as the sides 50 and 52 of the slot are urged together the free end 40 has a tendency to swing out from the slot a greater distance than the end of the clip which is connected to the link. The link is not specifically forced from the slot by the action of the cooperable converging sides but will move outwardly of the slot to some degree as the clip is forced outwardly.

This is a very desirable effect since the terminal end of the clip is swung far enough away from the slot and bow to allow it to be readily clipped over an object.

Figure 8:
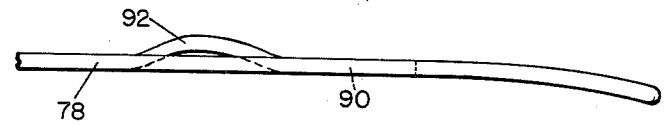
FIGURE 8 is an edge view of the embodiment illustrated in FIGURE 7.
Figure 9:
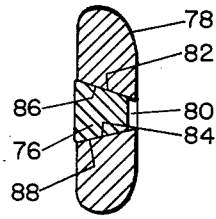
FIGURE 9 is an enlarged transverse sectional elevation of the bow and clip taken substantially on line 9—9 of FIGURE 7.

Referring now to the embodiment illustrated in FIGURES 7, 8 and 9, the clip 76 is shown integrally connected to the bow 78. The slot 80 is provided with inwardly converging sides 82 and 84 which are engaged against the converging sides 86 and 88 of the clip 76. Pressure applied to the bow on opposite sides of the slot will move the free end 90 of the clip outwardly from the bow in much the same manner as depicted in FIGURES 5 and 6. The curved portion 92 is formed into the clip for the purpose of insuring that substantially all of the inner surface of the free end 90 will engage the article to which the spectacles are clipped to in parallel relation.

Figure 10:
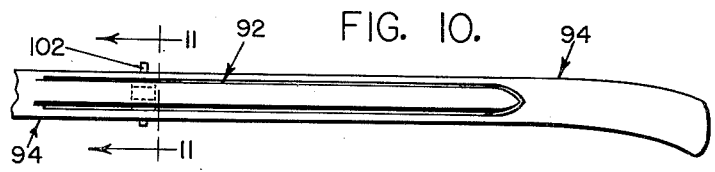
FIGURE 10 is a side elevational view of a further modification which includes tapered means in the bows.
Figure 11:
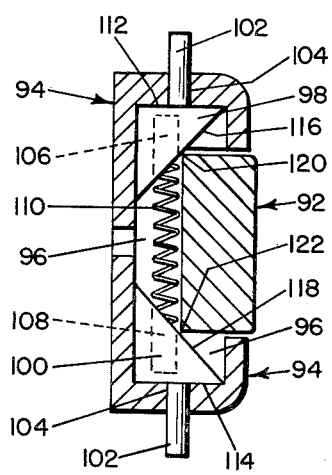
FIGURE 11 is an enlarged transverse sectional elevation of the bow taken substantially on line 11—11 of FIGURE 10.

FIGURES 10 and 11 illustrate a further embodiment of the invention. The clip 92 is shown integrally connected to the bow 94 and disposed into a recess 96. A pair of generally rectangular tapered plugs 98 and 100 are disposed in the recess in opposed relation, each having a stem 102 which extends through an aperture 104 disposed through each side of the bow, outwardly from the recess 96. The plugs are provided with opposed bores 106 and 108 to accommodate an expansion spring 110. This spring, having its end inserted into the bores bears against the plugs in opposite directions retaining the plugs in a normal position seated against the surfaces 112 and 114 within the recess.

Figure 12:
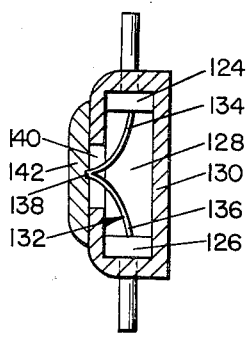
FIGURE 12 is an enlarged vertical sectional elevation taken through a spectacles bow showing a modified means for moving an adjacent clip out of engagement with a spectacles bow.
Figure 13:
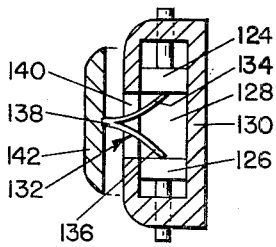
FIGURE 13 is a view similar to FIGURE 12 showing the clip in a flexed or open position.

Sufficient pressure is applied to each of the stems 102 to overcome the tension of the spring 110 causing the plugs to be urged towards each other. The tapered sides 116 and 118 of the plugs in engagement with the inner edges 120 and 122 of the clip will cause the clip to move outwardly from the recess. Additional means for moving a clip out of engagement with a bow is illustrated in FIGURES 12 and 13.

Plugs 124 and 126 are disposed in opposed relation in a cavity 128 within the bow 130. A resilient leaf type spring 132 is shown positioned within the cavity having its bifurcated ends 134 and 136 in contact with the plugs 124 and 126. The apex or opposite end 138 of the spring extends through an opening 140 and into engagement with the inward side of the clip 142. It is understood that the clip 142 is suitably anchored to the bow much in the same manner as is shown in FIGURES 7, 8 and 10.

As is clearly shown in FIGURE 13, when the plugs 124 and 126 are urged towards each other the spring is compressed inherently causing the apex 138 to move outwardly through the opening 140 and subsequently urging the clip outwardly from the bow 130.

From the foregoing specification it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded unnecessary.

Changes in shape, size, and arrangement of details and parts such as come within the purview of the invention claimed may be resorted to in actual practice, if desired.

I claim:

1. A spectacle frame bow comprising an elongated body of resilient material and having an elongated slot therein intermediate the longitudinal edges thereof, at least portions of the longitudinal side walls of the slot being arranged on converging planes, an elongated clip in said slot and substantially filling the same, said clip having one end yieldably connected to said body at one end of said slot, the portions of said bow body between the longitudinal edges of said bow and the longitudinal side walls of said slot being sufficiently resilient to flex inwardly when inward pressure is applied thereto intermediate the ends thereof, said slot side walls then acting to swing the other end of said clip out of said slot.

2. A spectacle frame bow comprising an elongated resilient body having an elongated slot therein between the longitudinal edges of said body, the portions of said body between said slot and the longitudinal edges of said body being sufficiently resilient to flex inwardly when inward pressure is applied thereto, an elongated clip extending at least partially into said slot and extending longitudinally thereof, means yieldably connecting one end of said clip to said elongated body said clip having longitudinal side walls including portions positioned on converging planes, said side wall portions being intermediate the ends of said slot and engaged by the portions of said body between said slot and the longitudinal edges of said body upon inward flexing of said last named portions to urge the other end of said clip from said slot.

3. A spectacle frame bow comprising an elongated resilient bow body having an elongated slot therein extending longitudinally thereof, said slot including longitudinal side wall portions arranged on converging planes, an elongated clip extending at least partially into said slot and extending longitudinally thereof between said slot side wall portions, the opposed portions of said body between said slot and the longitudinal side edges of said body being sufficiently resilient to flex inwardly when inward pressure is applied thereto, means yieldably connecting one end of said clip to said body adjacent one end of said slot, said clip having side portions arranged on converging planes substantially parallel to said side wall portions of said slot, whereby inward pressure against said opposed portions of said body will urge the other end of said clip from said slot.

4. A spectacle frame bow comprising an elongated resilient body having a longitudinal slot therein, said slot being intermediate the longitudinal edges of said body and providing opposed side portions between said slot and the longitudinal edges of said body, said opposed side portions being sufficiently resilient to flex inwardly when inward pressure is applied thereto, an elongated clip yieldably connected at one end to said body adjacent one end of said slot, said slot having a pair of longitudinally extending side walls, said clip having a pair of longitudinally extending side walls extending inwardly of said slot side walls, said side walls of said slot including portions arranged on converging planes, whereby inward flexing of the opposed side portions of the bow body in coaction with the converging planes of the slot side walls swings the free end of the clip from the slot.

5. A spectacle frame bow comprising an elongated resilient body having a longitudinal slot therein, said slot being intermediate the longitudinal edges of said body and providing opposed side portions between said slot and the longitudinal edges of said body, said opposed side portions being sufficiently resilient to flex inwardly when inward pressure is applied thereto, an elongated clip including a link portion pivotally connected at one end to said bow at one end of said slot, and a clip end portion pivotally connected at one end to the other end of said link portion, said clip being pivotal into and out of said slot, resilient means normally urging said link portion and said clip end portion toward aligned relation, and resilient means urging said link portion into said slot.

6. A spectacle frame bow comprising an elongated bow body having an elongated slot therein between the longitudinal edges of said body, an elongated clip having one end yieldably connected to said body at one end of said slot, said elongated clip fitting into said recess and normally held yieldably reclined therein, and tapered means on said body intermediate the ends of said slot, said tapered means being movable toward and away from said clip and being operable, upon movement toward said clip to swing the other end of said clip out of said slot, said yieldable connection acting to urge said other end of said clip toward said slot upon movement of said tapered means away from said clip.

7. A spectacle frame bow comprising an elongated resilient body having a longitudinal slot therein, said slot being intermediate the longitudinal edges of said body and providing opposed side portions between said slot and the longitudinal edges of said body, said opposed side portions being sufficiently resilient to flex inwardly when inward pressure is applied thereto, an elongated clip yieldably connected at one end to said body adjacent one end of said slot, said slot having a pair of longitudinally extending side walls extending inwardly of said slot side walls, side walls of said clip including portions arranged on converging planes, whereby inward flexing of the opposed side portions of the bow body in coaction with the converging planes of the clip side walls swings the free end of the clip from the slot.

References Cited in the file of this patent

UNITED STATES PATENTS

| 1,646,742 | Becker | Oct. 25, 1927 |
| 1,898,059 | McDonald | Feb. 21, 1933 |
| 2,042,400 | Hon | May 26, 1936 |
| 2,097,371 | Hon | Oct. 26, 1937 |

FOREIGN PATENTS

| 805,453 | Germany | May 21, 1951 |